United States Patent
Itami et al.

[11] Patent Number: 5,969,844
[45] Date of Patent: Oct. 19, 1999

[54] ROTOR AND POLYGON SCANNER THAT INCORPORATES THE ROTOR

[75] Inventors: Yukio Itami; Mitsuo Suzuki, both of Yokohama; Wataru Kashima, Ebina, all of Japan

[73] Assignee: Ricoh Company, Ltd., Tokyo, Japan

[21] Appl. No.: 09/014,568

[22] Filed: Jan. 28, 1998

[30] Foreign Application Priority Data

Jan. 28, 1997 [JP] Japan .................................. 9-013033

[51] Int. Cl.$^6$ .................................................. G02B 26/08
[52] U.S. Cl. .......................... 359/200; 359/198; 359/216
[58] Field of Search .................................. 359/198, 200, 359/216, 217, 218, 219

[56] References Cited

U.S. PATENT DOCUMENTS

| | | | |
|---|---|---|---|
| 5,438,447 | 8/1995 | Kunii ...................................... | 359/200 |
| 5,606,448 | 2/1997 | Suzuki et al. ............................ | 359/200 |

Primary Examiner—Cassandra Spyrou
Assistant Examiner—Darren E. Schuberg
Attorney, Agent, or Firm—Oblon, Spivak McClelland, Maier Neustadt, P.C.

[57] ABSTRACT

A rotor includes a hollow rotating shaft that is supported in a non-contact state by a radial self acting air bearing. The rotor also includes a contacting portion for positioning a rotating member in a rotating shaft direction that contacts with the rotating member from the rotating shaft direction. An engaging portion is included for positioning the rotating member in a direction perpendicular to the rotating shaft direction that engages with an inner surface of the rotating member. A holding portion is formed either in plural portions in a peripheral direction or as a single integrated portion that extends in the peripheral direction near the rotating member that is positioned by the contacting portion and the engaging portion, and that presses the rotating member from an opposite side of the contacting portion by deformation of one portion or a whole portion of the holding portion, and positions and holds the rotating member.

19 Claims, 17 Drawing Sheets

ROTOR AND POLYGON SCANNER THAT INCORPORATES THE ROTOR

BACKGROUND OF THE INVENTION

1. Field of the Invention

The present invention relates to a cost-efficient, accurately-assembled rotor structure (i.e., a rotor) that is supported, in a non-contact state, by a radial self-acting air bearing, and a polygon scanner using the rotor so as to provide enhanced reliability of the polygon scanner as a result of how a rotating member of the polygon scanner is held.

2. Discussion of the Background

Electrophotographic recording apparatuses, such as laser printers or digital copying machines etc., that operate by way of forming a latent image with a light beam are proliferating as a result of their characteristic high image quality, high speed recording, low noise etc., and low price. Such apparatuses include a light source pointed at a rotatable polygon scanner that rotates at 20,000 revolutions per minute (rpm) for high speed recording and high density processing applications. However, if used, conventional bearings that support the rotatable polygon scanner suffer from reliability, noise and longevity (bearing life) concerns as a result of the high speed operation. Therefore, self-acting air bearings that provide support to the scanner are used where the support is provided by a cushion of air.

In reference to FIGS. 19 and 20, Japanese Laid Open Patent No. 5-216707 discloses a self-acting air bearing that supports a high speed rotation of a polygon mirror 2. A rotor 1 is structured in a way so as to mount the polygon mirror 2 on an upper surface of a flange portion 3a that is formed around a center of a shaft direction of a hollow rotating shaft 3 and by holding and fixing the polygon mirror 2 by clamping a mirror keeper 4, which closes one edge of the hollow rotating shaft 3 by a screw, and by engaging a rotor yoke 7 that mounts a rotor magnet 6 in an inner side with a lower surface of the flange portion 3a and by adhering the rotor yoke 7 by way of glue. The rotor magnet 6 and the rotor yoke 7 face a driving coil on a housing side (not shown) and form a driving portion (a motor portion) on a rotor side so that the polygon scanner forms an axial gap direct current brushless motor.

In rotor 1, a fixing shaft that is fixed in a housing is inserted into the hollow portion of the hollow rotating shaft 3. Arranged this way, the rotor 1 is radially supported in a noncontact state by generating a self acting air flow between the rotor 1 and a surface of the hollow rotating shaft 3. Air is conveyed by a groove, such as a herringbone groove, that is formed on a peripheral surface of the fixing shaft. Axially, the rotor 1 is supported in a noncontact state by magnetic force that repels in a vertical direction by facing a permanent magnet 5, mounted on the mirror keeper 4, with permanent magnets that are mounted on an upper portion of the fixing shaft and a cover not shown in FIG. 19. In FIG. 19, a groove 6a is for correcting balance so as to avoid generating large vibrations when the rotor 1 rotates at high speed.

In FIG. 20, with respect to the hollow rotating shaft 3, two states that are viewed from upper diagonal direction and lower diagonal direction are shown, however, the views do not indicate that the hollow rotating shaft 3 needs two pieces. Rather, the views are shown this way so that mounting portions of an upper side and a lower side of the hollow rotating shaft 3 are easy to be understood, and preferred embodiments that will be described below will be presented in a similar fashion.

As a driving portion that rotates the rotor, other than axial gap type rotors, for instance, there are direct current brushless motors of a radial gap-inner rotor type, as disclosed in Japanese Laid Open Patent No. 5-231427. Also, radial gap outer rotors are available, as disclosed in Japanese Laid Open Patent No. 61-9138.

However, such conventional self acting air bearing type polygon scanners are subject to getting hot during high speed rotation and thus subjected to repeated temperature swings as the polygon scanner is cycled on and off during its life span. As a consequence, the glue used for fixing a rotor yoke 7 to the lower surface of the flange portion 3a of the hollow rotating shaft 3 is reduced in strength. The glue is also subject to shearing stress do to differences in coefficient of thermal expansion of the hollow rotating shaft 3 and the rotor yoke 7. Subject to such stains, the glue eventually fails and the rotor yoke 7 shifts, causing the rotor 1 to become unbalanced. Further, in an extreme case, there is a problem that the rotor yoke 7 falls from the hollow rotating shaft 3.

The mirror keeper 4 of the rotor 1 clamps and fixes the polygon mirror 2 that is mounted on the upper surface of the flange portion 3a of the hollow rotating shaft 3 by passing the screw 8 through the through hole 4a and clamping a screw hole 3b of the hollow rotating shaft 3 with a screw 8. Thus, the processes for forming the through hole 4a in the mirror keeper 4 and for forming the screw hole 3b in the hollow rotating shaft 3 must be precise, which increases expense. Further, residual cutting oil may remain within the screw hole 3b, where the cutting oil scatters during high speed rotation and soils optical parts such as the polygon mirror or a window glass that is mounted in the cover etc., and therefore elaborate cleaning is required, with associated higher expense.

Further, in the self acting air bearing type polygon scanner, surface accuracy of the reflecting surface of the polygon mirror 2 is required. Since a mounting surface of the flange portion 3a is processed coaxially and unitarily with the hollow rotating shaft 3, it has no problem. However, an edge surface of the mirror keeper 4, for pressing the upper surface of the polygon mirror 2, requires high processing accuracy and assembling accuracy and thus also increases the cost.

SUMMARY OF THE INVENTION

Accordingly, an object of this invention is to provide a rotor and polygon scanner incorporating the rotor that overcomes the above-described problems and limitations with the prior art.

Another object of the present invention is to provide a rotor and polygon scanner, the holding state of which is immune to temperature change and more reliable than conventional devices as a result of positioning and holding a rotating member by pressure from a deformed member, with associated benefits of improved assembling accuracy and reduced cost.

These and other objects and advantages are achieved by the present invention that provides a rotor structure including a hollow rotating shaft that is supported in a non-contact state by a radial self acting air bearing, a contacting portion that positions a rotating member in a rotating shaft direction that contacts with the rotating member from the rotating shaft direction, an engaging portion for positioning the rotating member in a direction perpendicular to the rotating shaft direction that engages with an inner surface of the rotating member, a holding portion that is formed in plural portions in a peripheral direction or as being extended in the peripheral direction near the rotating member that is positioned by the contacting portion and the engaging portion, and that presses the rotating member from an opposite side of the contacting portion by deformation of one portion or a whole portion of the holding portion, and positions and holds the rotating member.

BRIEF DESCRIPTION OF THE DRAWINGS

In describing preferred embodiment of the present invention illustrated in the drawings, specified terminology is employed for the sake of clarity. However, the invention is not intended to be limited to the specific terminology so selected, and it is to be understood that each specific element includes all technical equivalents that operate in a similar purpose.

A more complete appreciation of the present invention and many of the attendant advantages thereof will be readily obtained as the same becomes better understood by reference to the following detailed description, particularly when considered in considered in connection with the accompanying drawings, wherein.

DESCRIPTION OF THE PREFERRED EMBODIMENTS

Figure 1:
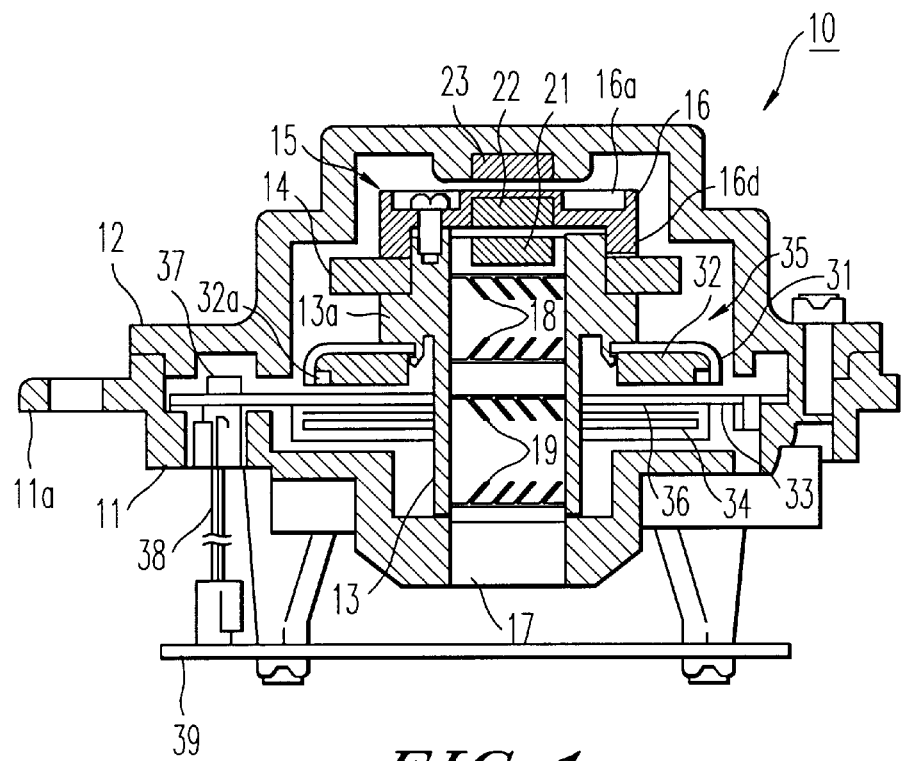
FIG. 1 is a sectional view in a vertical direction showing a whole structure of a first embodiment of a self acting air bearing type polygon scanner using a rotor structure according to the present invention.
Figure 2:
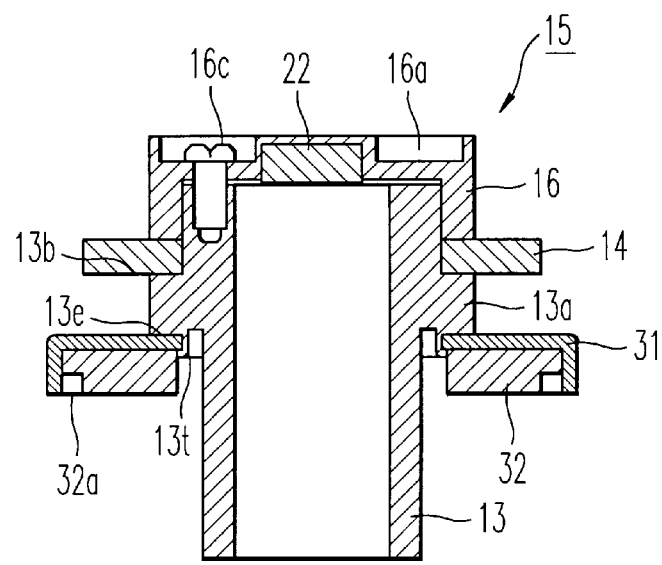
FIG. 2 is a sectional view in a vertical direction showing the rotor of FIG. 1.
Figure 3:
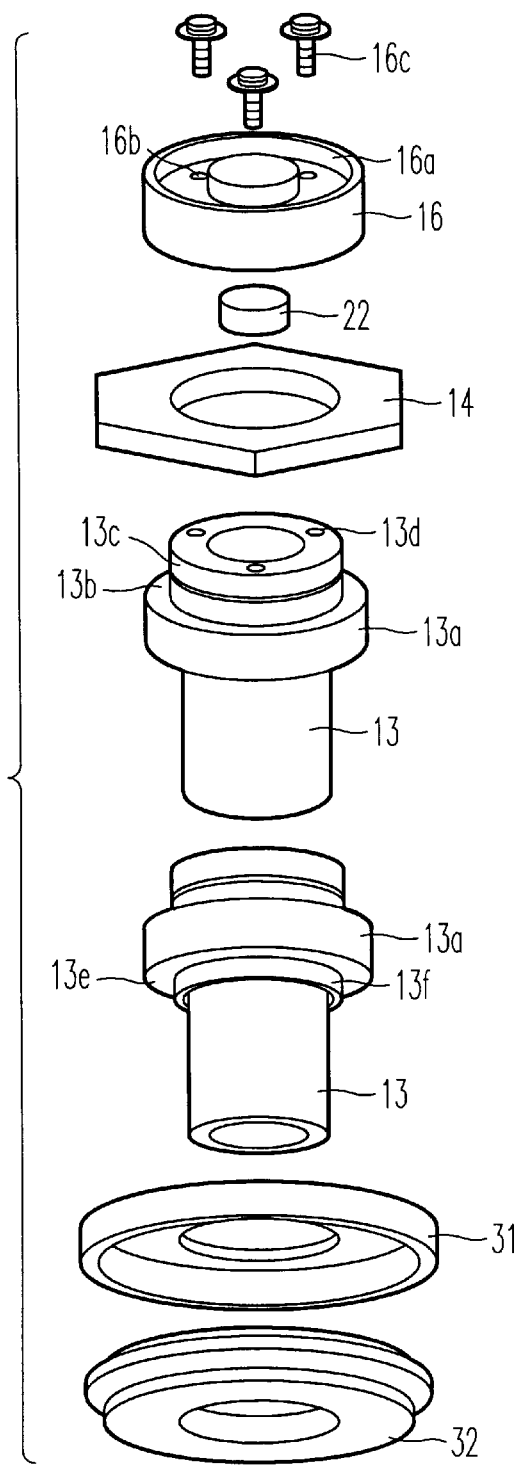
FIG. 3 is an exploded perspective view of the rotor of FIGS. 1 and 2.

Referring now to the drawings, wherein like reference numerals designate identical or corresponding parts throughout the several views, and more particularly to FIGS. 1–3, a first embodiment of a self acting air bearing type polygon scanner is shown using a rotor structure according to the present invention.

First, a basic structure of the polygon scanner will be described. In FIGS. 1–3, a self acting air bearing type polygon scanner 10 has a reference surface 11a that is formed in collar form in a housing 11 that is mounted to a recording apparatus body (not shown). A rotor 15 is shown in which a polygon mirror 14 is mounted and held on a flange portion (large diameter portion) 13a that is one portion of a peripheral surface of a hollow rotating shaft 13 of a cylindrical form, extended in a diameter direction, and rotates within a space between the housing 11 and a cover 12. The polygon mirror 14 of this embodiment is held at a position by a mirror keeper 16 that is mounted on an upper surface (mounting surface) 13b of the flange portion 13a of the hollow rotating shaft 13. The mirror keeper 16 is formed in a cap form so as to close one edge of the hollow portion of the shaft 13 and clamp (presses) the polygon mirror 14 to the upper surface 13b of the flange portion 13a by a screw 16c. The screw 16c passes to through hole 16b that is formed in a correcting groove 16a described below the upper surface side and that is inserted into a screw hole 13d of an upper portion 13c of the shaft of the hollow rotating shaft 13.

In a center of the housing 11, a fixing shaft 17 of cylindrical form is strongly fixed in a vertical direction by press fitting or shrink fitting, and is inserted into the hollow rotating shaft 13. This fixing shaft 17, as a groove for generating a dynamic pressure, a pair of herringbone grooves 18 and 19 are formed on a peripheral surface of upper and lower portions at same interval in a peripheral direction, and when the rotor rotates, dynamic pressure air of high pressure is generated between an inner surface of the hollow rotating shaft 13 and the fixing shaft 17, and the hollow rotating shaft 13 is supported in non-contact state in a radial direction. Further, on the fixing shaft 17, the mirror keeper 16, and the cover 12, permanent magnets 21–23 are mounted respectively so that the same poles faces each other, and as a consequence the mirror keeper 16 is supported in non-contact state between the cover 12 and the fixing shaft 17 by the magnets repulsive magnetic forces, and the rotor 15 is supported in non-contact state in a axial direction. Namely, a radial self acting air bearing is structured between the inner surface of the hollow rotating shaft 13 and the outer surface of the fixing shaft 17 by the herringbone grooves 18 and 19. Furthermore, an axial bearing of a repelling type in upper and lower directions is enabled by the permanent magnets 21–23.

As a driving portion of the rotor 15, on a lower surface 13e of the flange 13a of the hollow rotating shaft 13, a rotor yoke 31 and a rotor magnet 32 are fixed by glue and a wiring coil 34 is arranged as facing the rotor magnet 32 on a rear surface of a printed board 33 that is fixed to the housing 11 by a screw or glue, and thereby a direct current brushless motor 35, being of an axial gap, coreless and surface facing type, is structured. In the motor 35, a hall element 36 is mounted on a rear surface of the print board 33, and the printed board 33 is connected to a driving circuit 39 that is fixed on a lower portion of the housing 11 by a connector 37 and a harness 38, and applying electricity to the wiring coil 34 is successively switched in accordance with a position detecting signal of the hall element 36, and thereby rotation of the rotor 15 is controlled at constant speed.

The rotor 15 rotates at the constant high speed, aided by being held in a non-contact state in the radial and the axial directions. A laser light from a semiconductor laser illuminates the polygon mirror by way of a glass window (not shown) that opens in the cover 12 for sealing the inner side, and the laser light beam is deflected on a reflecting surface of the polygon mirror 14 so as to scan a predetermined In the ho a photoconductive element of the recording apparatus body.

In the hollow rotating shaft 13, the fixing shaft 17 and the mirror keeper 16, aluminum alloy of low specific gravity is used for making the polygon scanner light in weight and drivable to high speeds. The inner surface of the hollow rotating shaft 13 is processed by surface preparation of nonelectrolytic composite nickel plating in order to prevent abrasion during starting and stopping operations, and ceramic or resin are fixed to thereby resist abrasion and provide lubricity.

The rotor magnet 32 is made by a plastic magnet, and since this plastic magnet is larger in coefficient of thermal expansion and smaller in mechanical strength than metal, the rotor yoke 31 is formed in a cup, concave, form and the outer peripheral surface of the rotor magnet 32 is covered with the outer peripheral portion of the rotor yoke 31 and thereby the outer diameter is held constant. Consequently, the rotor magnet 32 is prevented from expanding in a radial direction due to thermal expansion or centrifugal force by high speed rotational operation, and balance breakage of the rotor 15 or breakage of the rotor magnet are prevented. Further, the rotor yoke 31 is made by ferromagnetic material, and thereby the magnetic path is closed, and magnetic leakage is prevented, and driving efficiency of the motor 35 is improved over conventional devices. As specific examples of material used by this rotor yoke 31, iron steel or stainless steel are used. Further, in the mirror keeper 16, a fine hole for connecting an inner and an outer portion of the hollow rotating shaft 13 is formed and vibration in the axial direction is reduced, and correcting grooves 16a and 32a are formed in an upper surface of the mirror keeper 16 and in a lower surface of the rotor magnet 32 and unbalanced vibration is minimized such that balance is corrected. (The fine hole 16d of the mirror keeper 16 is drawn in only FIG. 1 and it is omitted in other Figures).

Next, a fixing (holding) feature of a rotating member that is characteristic of this embodiment will be described. In this embodiment, the rotor yoke as the rotating member is held and fixed to the hollow rotating shaft will be described.

In the hollow rotating shaft 13, a holding portion 13f of ring form, which is parallel to a peripheral surface of the hollow rotating shaft 13, is formed in a lower surface 13e of the flange portion 13a, and this holding portion is formed by a step portion formed in an outer diameter that is engaged with the inner surface of the rotor yoke 31, in the lower surface 13e of the flange 13a, and by forming a groove in a portion that is adjacent to the peripheral surface of the hollow rotating shaft 13, when this flange portion 13a is formed by cutting processing. Then in the holding portion 13f, the rotor yoke 31 is engaged with the outer surface of the holding portion and is contacted with the lower surface 13e of the flange portion 13a, and then a caulking tool (not shown in FIGS. 1–3) is inserted between the hollow rotating shaft body 13. The holding portion 13f and the holding portion 13f is caulked and deformed so that plural portions or a whole periphery of a tip side is extended in diameter, and the rotor yoke 31 is pressed to the lower surface 13e of the flange portion 13a and is positioned and held in place.

With respect to the rotor yoke 31 that is positioned in a rotating shaft direction and in contact with the lower surface 13e of the flange portion 13a, the inner surface of the rotor yoke 31 is engaged with the holding portion 13f and is positioned in a radial direction (direction perpendicular to the rotating shaft). The yoke 31 is positioned and held by being pressed from an opposite side of the lower surface 13e of the flange portion 13a by the deformed holding portion 13f. Namely, the holding portion 13f serves not only as a holding portion but also as an engaging portion and the lower surface of the flange portion 13a serves as a contacting portion.

As described above, in this embodiment, the rotor yoke 31 is positioned in the radial direction by being engaging with the holding portion 13f and is positioned in the rotating shaft direction by being contacted to the lower surface 13e of the flange 13a and by being pressed by the deformed holding portion 13f from the opposite direction. Therefore fixing by glue is not necessary, and the unbalance of the rotor 15, which is a problem with conventional devices, caused by position shift of the rotor yoke by the temperature change or the falling of the rotor yoke is prevented. Therefore the rotating accuracy of the rotor 15 is maintained and the reliability is improved.

Moreover, the holding portion 13f is formed in a ring shape and apart from the peripheral surface of the hollow rotating shaft 13 and therefore providing a space for insertion of the caulking tool. Furthermore, the shape and position of the holding portion 13 is such that during the deforming process, stress is not imparted on the hollow rotating shaft body 13 so that mechanical integrity of the hollow rotating shaft 13 body is preserved and thus will serve as an accurate bearing surface of the radial self acting air bearing and maintain rotating accuracy of the rotor. Further, the hollow rotating shaft 13 is formed with an aluminum alloy, and its inner surface is processed by the surface preparation of the nonelectrolytic composite nickel plating and thereby the abrasion resistibility and the lubricity are increased, and therefore property as the self acting air bearing can be assured and the holding portion 13f can be deformed easily by being caulked and the stress by this can be deformation can be reduced.

The outer peripheral portion of the rotor yoke 31 covers the outer peripheral surface of the rotor magnet 32 and therefore the expansion of the rotor magnet 32, by centrifugal force and heating thereof by lengthy high speed rotation, is prevented by its outer peripheral portion, and an imbalance of the rotor 15 is prevented and the breakage of the rotor magnet itself can be prevented. Further, the leakage of the magnetic flux can be prevented and the driving efficiency of the motor 35 can be improved.

In this embodiment, the holding portion 13f is made in a ring form and thereby the rotor yoke 31 is engaged with and held to it, however, this is not limited, and the holding portion 13f can be divided into plural portions in a peripheral direction and it can be divided into an engaging portion and a holding portion. Further, in the motor 35 in this embodiment, the rotor magnet 32 of disc form is fixed to the rotor yoke 31 to form a direct current brushless motor of the axial gap type. However, the rotor magnet 32 of the ring form may be fixed to an outer peripheral portion of the rotor yoke 31 and thereby form a direct current brushless motor of a radial gap outer rotor type. Further, the rotor yoke 31 can be held not only by the holding portion 13f and but also by glue together with it, so as to reduce assembly time.

Figure 4:
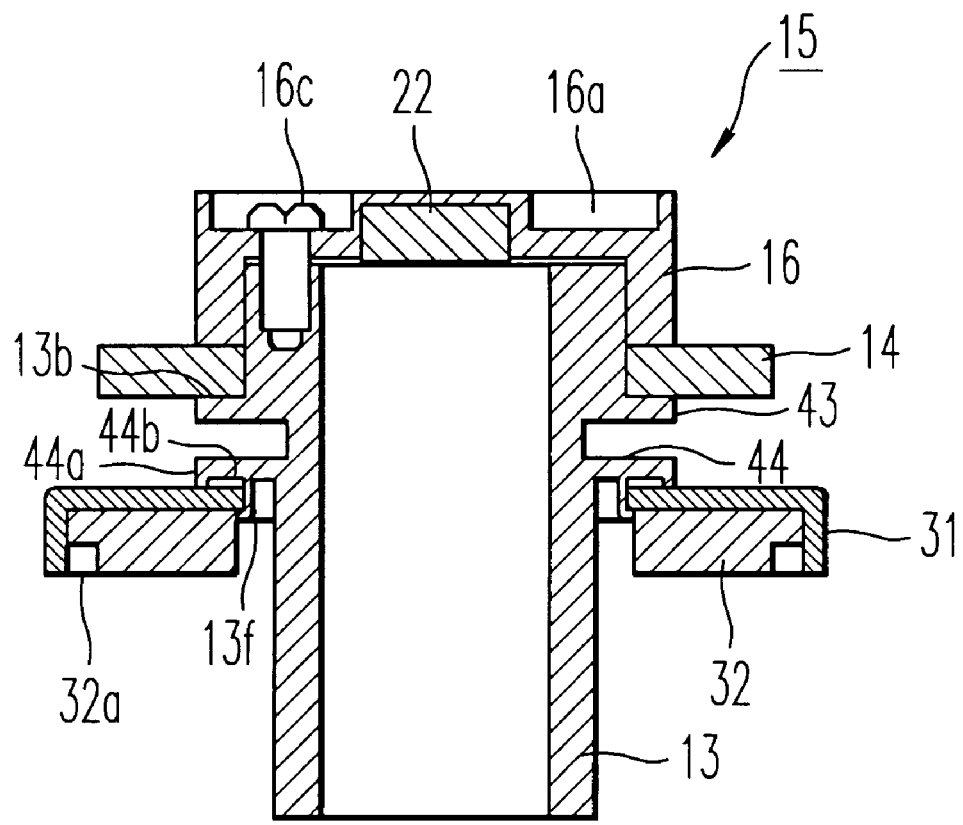
FIG. 4 is a sectional view in a vertical direction showing a whole structure of a second embodiment of a self acting air bearing type polygon scanner using a rotor structure according to the present invention.
Figure 5:
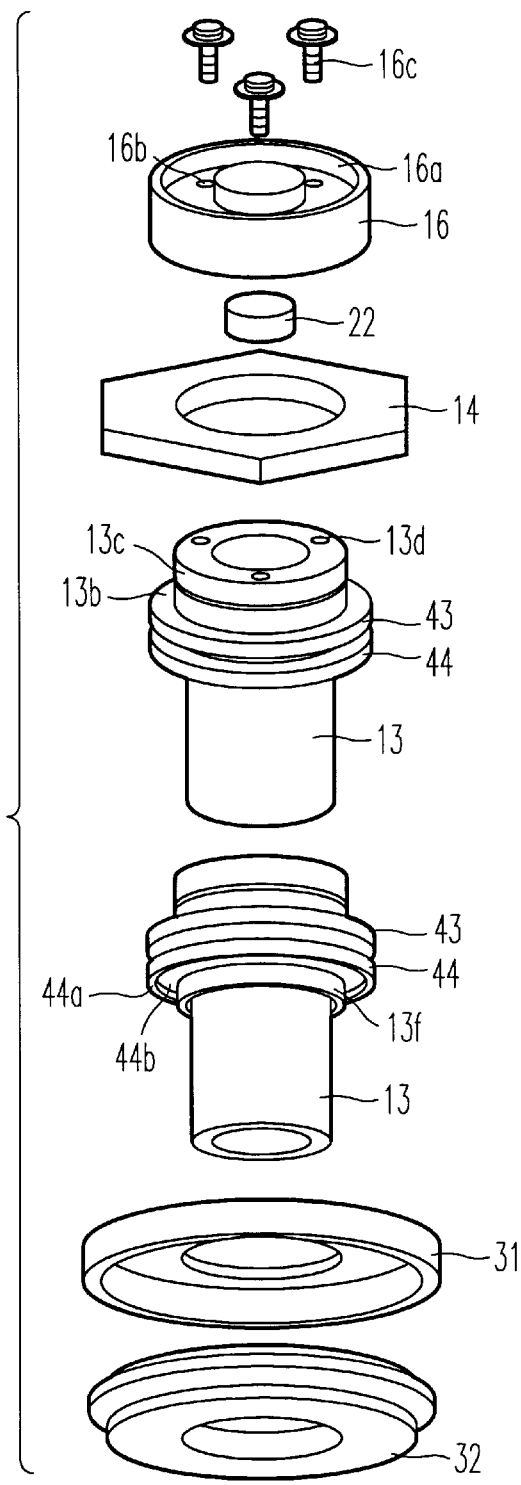
FIG. 5 is a sectional view in a vertical direction showing the rotor of FIG. 4.

FIGS. 4 and 5 are views showing a second embodiment of a self acting air bearing type polygon scanner using a rotor structure according to the present invention. Due to similarities with the first embodiment, same elements are indicated by same numerals and a discussion of these elements is omitted herein. In this second embodiment, a characteristic feature is that the rotor yoke as the rotor member is held and fixed to the hollow rotating shaft, as will be described.

Numerals 43 and 44 represent first and second flanges where the flange portions 13a are divided vertically in two separate portions, and the polygon mirror 14 is mounted on an upper surface 13b of the first flange portion and is fixed by the mirror keeper 16, and the rotor yoke 31 is held on a lower surface 13e of the second flange 44 by the holding portion 13f.

In the second flange portion 44, an edge portion 44a of the outer peripheral portion is formed as being extended to a side of the rotor yoke 31, and an inner peripheral portion 44b of a side that is adjacent to a peripheral surface of the hollow rotating shaft 13 is thinly formed and elastically deformable. Therefore, in this second flange portion 44, when the rotor yoke 31 is engaged with the holding portion 13f and is contacted to the second flange portion 44, only the edge portion 44a is contacted to the rotor yoke 31. Then when a tip portion of the holding portion 13f is caulked and is deformed, the inner peripheral portion 44b is bent and excess stress by the deformation is absorbed and the influence is not generated in the side of the hollow rotating shaft, and simultaneously the rotor yoke 31 is positioned and held by the elastic force of the inner peripheral portion 44b. Namely, the second flange portion 44 forms a large diameter portion and its edge portion 44a forms a contacting portion and its inner peripheral portion 44b forms an elastic deforming portion.

As described the above, other than the technical advantages of the above embodiment, the rotor yoke 31 contacts the edge portion 44a of the second flange portion 44 and its tip portion is caulked and deformed to hold rotor yoke 31. However, the second flange portion 44 is bent in the rotating shaft direction by the deformation process and thus the stress that is generated by the deformation or the temperature changing etc. can be absorbed while the rotor yoke 31 is held. Further, in the second flange portion 44, only the edge portion 44a contacts the rotor yoke 31, and therefore the position that the rotor yoke 31 is contacted does not changed largely and the rotor yoke 31 is positioned by the stable elastic force of the inner peripheral portion. Therefore a rotating accuracy of the rotor 15 can be maintained and the rotor yoke 31 can be assembled to the hollow rotating shaft easily and highly accurately during assembly.

Figure 6:
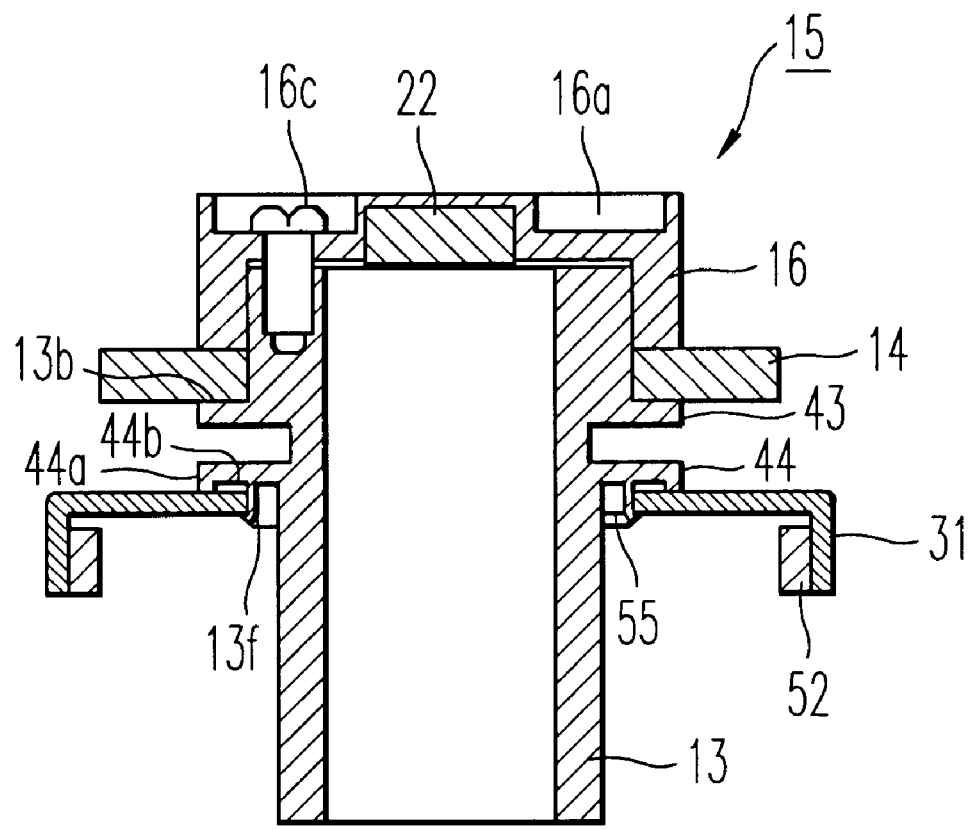
FIG. 6 is a sectional view in a vertical direction showing a whole structure of a third embodiment of a self acting air bearing type polygon scanner using a rotor structure according to the present invention.
Figure 7:
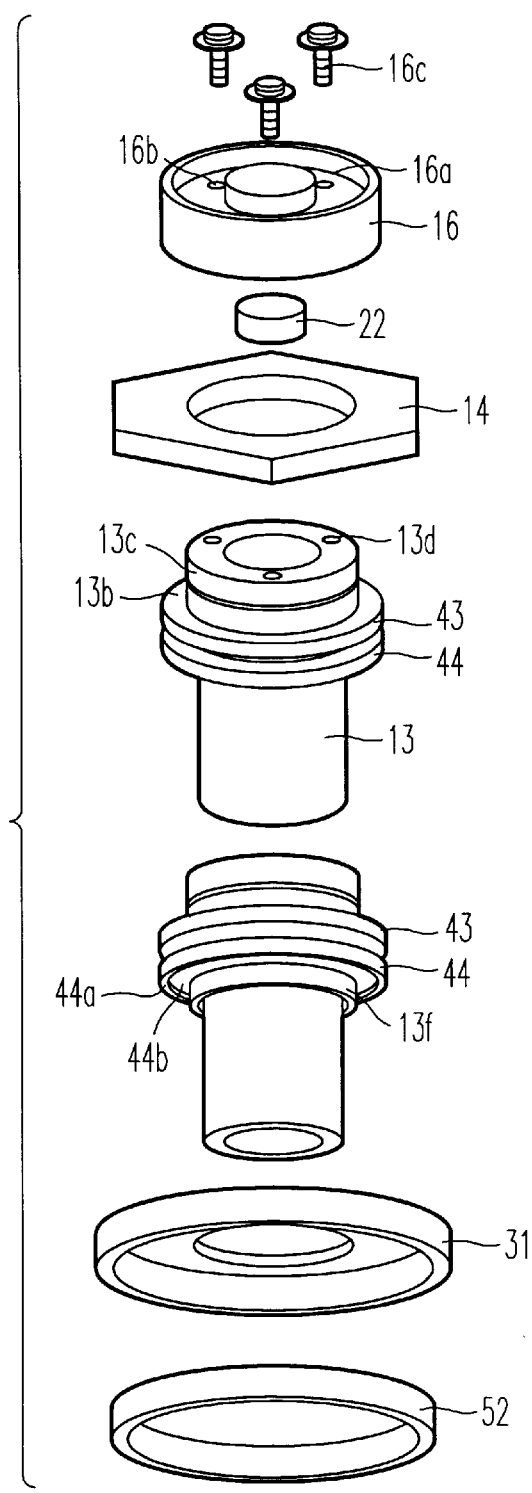
FIG. 7 is an exploded perspective view of the rotor of FIG. 6.

Next, described are FIGS. 6 and 7 which show a third embodiment of a self acting air bearing type polygon scanner using a rotor structure according to the present invention. Similar elements are labeled consistent with same components described in reference to the previous embodiments. Accordingly, the present description of the present embodiment will emphasize the different features, such as how the rotor yoke, as the rotor member, is held and fixed to the hollow rotor shaft.

In both FIGS. 5 and 6, numeral 52 is a rotor magnet and the rotor magnet 52 is formed in a ring form across the outer peripheral portion of the rotor yoke 31 so a space in an inner side is assured. Therefore in this embodiment, a direct current brushless motor of a radial gap outer rotor type has the driving coil mounted in the inner side of the rotor magnet 52. Further, the rotor magnet 52 is formed in the ring form and therefore the correcting groove 32a that is formed in the rotor magnet 32 is not formed in its lower surface, however, a space is formed between the hollow rotating shaft body 13 and the holding portion 13f that is formed in the ring form, and therefore the space is used for a groove for correcting balance and a dead weight 55 for correcting balance is mounted into a position of the dynamic unbalance.

As described the above, in this embodiment, other than the technical advantages of the above embodiments, the rotor magnet 52 of the ring form is fixed to the rotor yoke 31 and the direct current brushless motor of the radial gap outer rotor type is formed, and thereby allowing for a reduced height rotor 15.

Further, the dead weight 55 is arranged between the holding portion 13f and the peripheral surface of the hollow rotating shaft body 13, and without the correcting groove in the rotor magnet 52, the balance of the rotor 15 is corrected, and the processing cost is suppressed.

Figure 8:
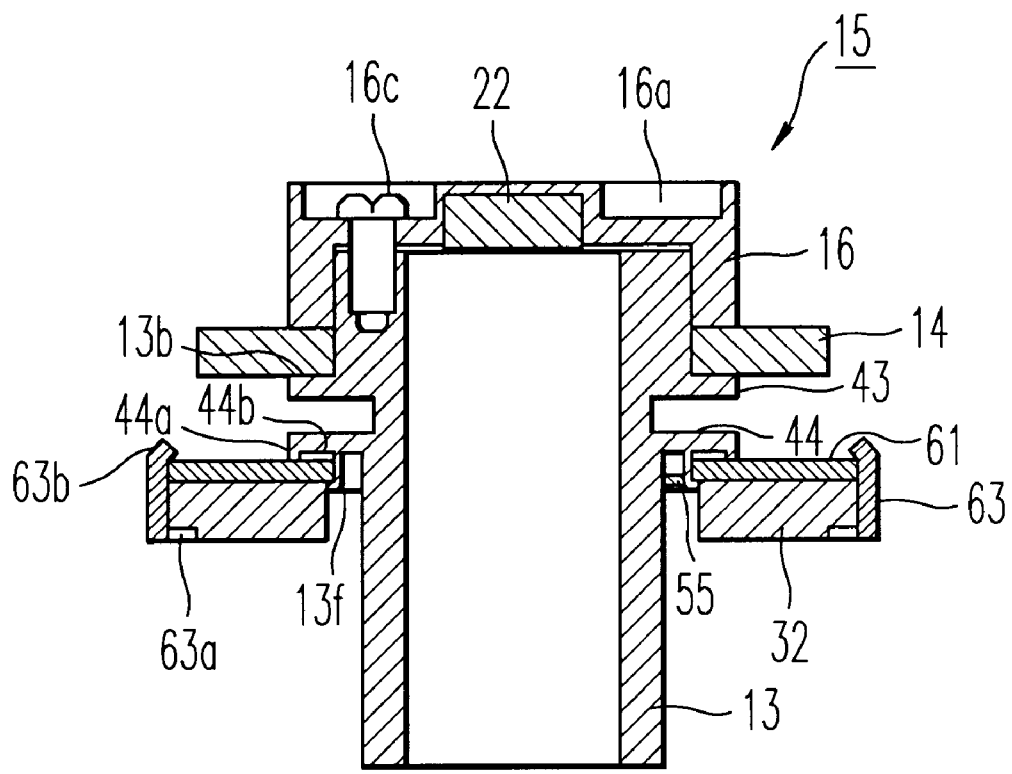
FIG. 8 is a sectional view in a vertical direction showing a whole structure of a forth embodiment of a self acting air bearing type polygon scanner using a rotor structure according to the present invention.
Figure 9:
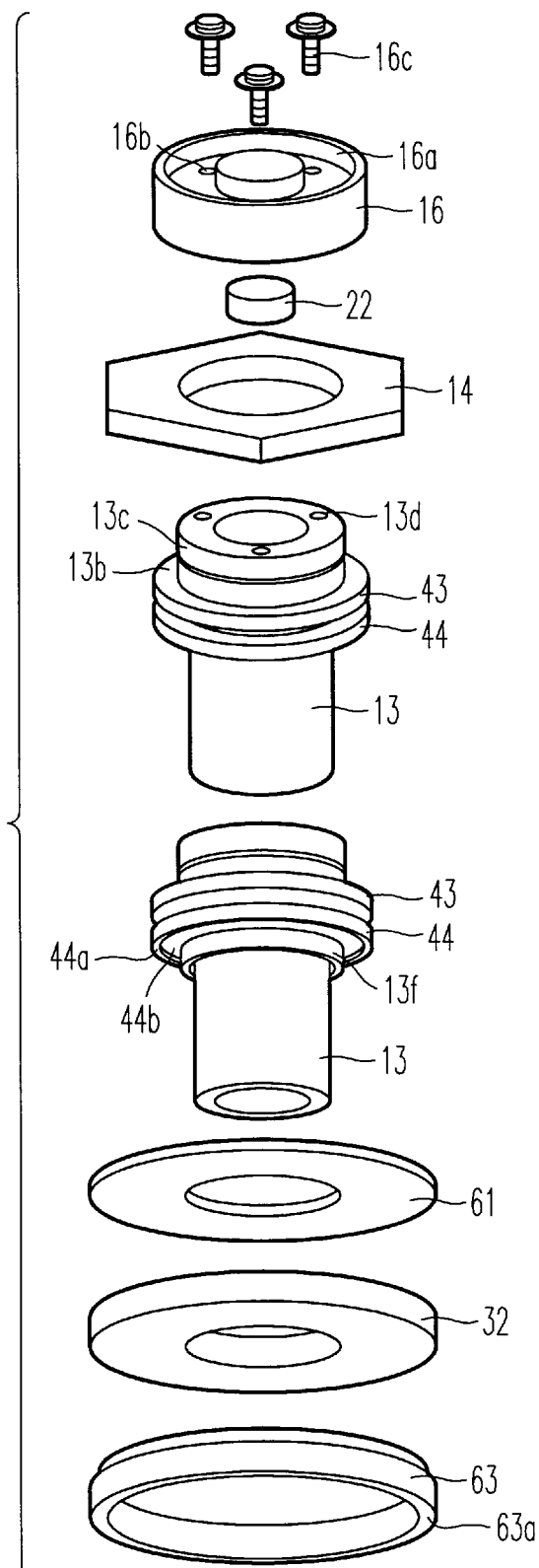
FIG. 9 is an exploded perspective view of the rotor of FIG. 8.

Next, FIGS. 8 and 9 are views showing a fourth embodiment of a self acting air bearing type polygon scanner using a rotor structure according to the present invention. Similar elements are labeled consistent with same components described in reference to the previous embodiments. Accordingly, the present description of the present embodiment will emphasize the different features including how the rotor yoke as the rotor member is held and fixed to the hollow rotor shaft.

In both FIGS. 8 and 9, a rotor yoke 61 made of a ferromagnetic material is used and formed in a disk shape. The rotor yoke 61 is held to the lower surface 13e of the second flange portion 44 of the hollow rotating shaft 13 by the holding portion 13f and the rotor magnet 32 is glued and fixed to its lower surface, similar to that described in the earlier described embodiments. Further, on an outer peripheral surface of this rotor yoke 61, a cylindrical member 63 of nonmagnetic material, which is formed in disc form, covers an outer peripheral surface of the rotor magnet, and this cylindrical member 63 prevents the rotor magnet 32 from expanding in the radial direction by thermal expansion or centrifugal force so that it prevents the imbalance of the rotor 15 and prevents the rotor magnet 32 from breaking.

In the case that the outer peripheral surface of the rotor magnet 32 is covered with the ferromagnetic material as with the rotor yoke 31 of the above described embodiment, magnetic flux of the outer peripheral portion of the rotor magnet 32 that should go to a stator side of the motor 35 actually turns around toward the rotor yoke 31 and it is not used effectively. Since rotating torque that is generated by the magnetic flux of this rotor magnet 32 is larger in accordance with outer peripheral side, it is one of the causes that inhibits the driving efficiency of the motor 35. In order to compensate the reduced amount of this rotating torque, the outer diameter of the rotor magnet 32 is made large.

However, moment of inertia together with mass are also increased and therefore it is not suitable for the rotor 15 which must rotate at high speed.

On the other hand, the cylindrical member 63 in this embodiment is made by of nonmagnetic material. Therefore, the magnetic flux of the outer peripheral portion of the rotor magnet 32 can be prevented from turning around to the rotor yoke 61. Consequently, the outer diameter of the rotor magnet 32 remains small and the magnetic flux of the outer peripheral portion is used effectively, and thus the rotor 15 that can be suitably small and light for high speed rotation, without mass or moment of inertia concerns.

In the cylindrical member 63, a hooking portion 63a is formed in one edge portion in the shaft direction is extended in the inner direction, and the rotor magnet 32 is glued and fixed or press-fitted so as to be hooked at the hooking portion 63a and the rotor yoke is mounted thereon. Subsequently, an edge portion 63b of rotor yoke side is caulked in the inner direction. Thus, the cylindrical member 63, even if the glue is reduced or omitted, and the rotor magnet 32 can be positioned and held to the rotor yoke 61. Further, in this embodiment, for correcting the balance of the rotor 15, the dead weight 55 is arranged into a space between the holding portion 13f and the peripheral surface of the hollow rotating shaft body 13.

As described above, in this embodiment, other than the technical advantages of the above embodiments, the outer peripheral surface of the rotor magnet 32 is covered with nonmagnetic cylindrical member 63 and therefore the magnetic flux of the rotor magnet 32 does not turn around to the outer portion and a brushless motor of an axial gap type that can be efficiently driven by the rotor 15 suitable for the high speed is achieved.

Figure 10:
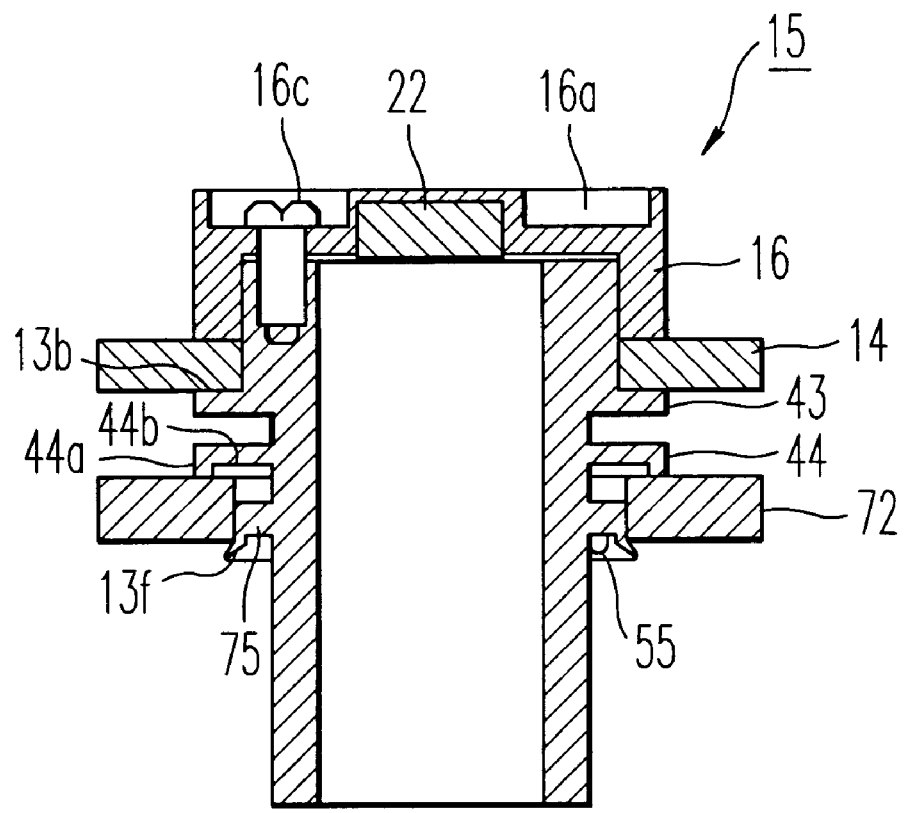
FIG. 10 is a sectional view in a vertical direction showing a whole structure of a fifth embodiment of a self acting air bearing type polygon scanner using a rotor structure according to the present invention.
Figure 11:
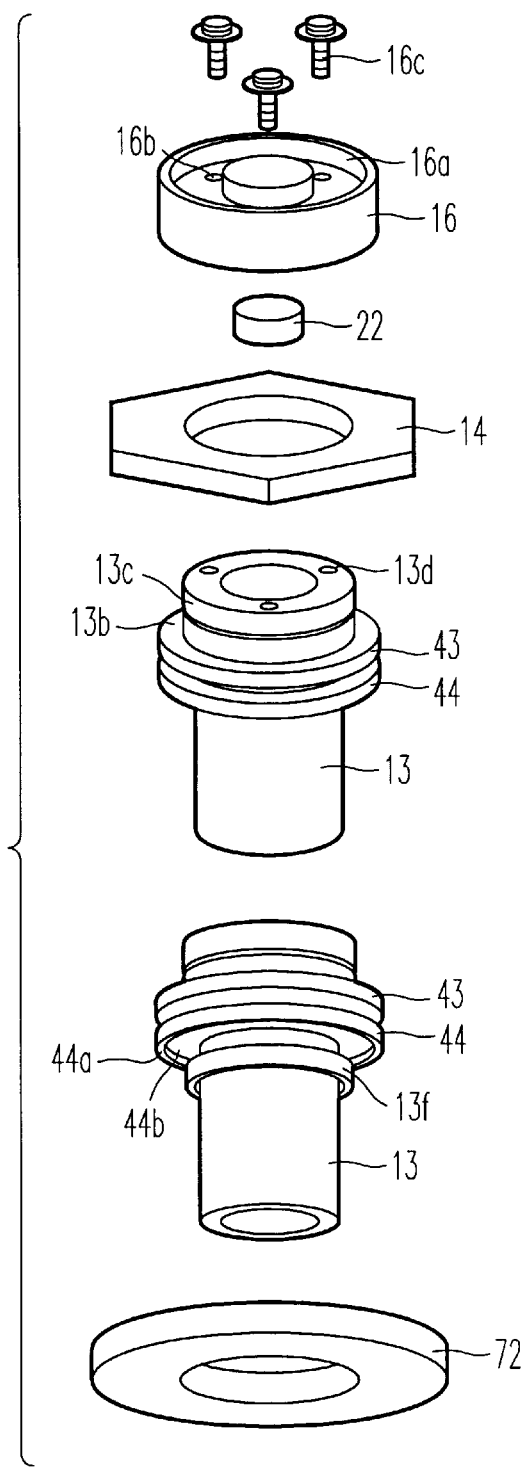
FIG. 11 is an exploded perspective view of the rotor of FIG. 10.

FIGS. 10 and 11 are views showing a fifth embodiment of a self acting air bearing type polygon scanner using a rotor structure according to the present invention. Similar elements are labeled consistent with same components described in reference to the previous embodiments. Accordingly, the present description of the present embodiment will emphasize the different features including how the rotor magnet as the rotor member is held and fixed to the hollow rotating shaft.

In both FIGS. 10 and 11, a rotor magnet 72 is formed in a disk shape and made of an aluminum manganese magnet material. The rotor magnet 72 is held in direct contact with the edge portion of the lower surface 13e of the second flange portion 44 of the hollow rotating shaft 13 because the mechanical strength of the aluminum manganese magnet material is high enough to tolerate the stress.

This rotor magnet 72 is held in place by pressing an opposite side of the edge portion 44a of the second flange portion 44 because it is not fixed to the rotor yoke 31 and 61 as described above. However, in this case, the rotor magnet 72 may be held by extending the holding portion 13f in the above embodiment and caulking and deforming its tip. In this embodiment, the peripheral surface of the hollow rotating shaft body 13, which is close to the edge of the rotor magnet 72, is extended in diameter and thereby a third flange portion 75 is formed and the holding portion 13f is formed at its edge and to hold the rotor magnet 72.

In this embodiment, in order to correct the balance of the rotor 15, the dead weight 55 is arranged in a space between the holding portion 13f and the peripheral surface of the hollow rotating shaft body 13.

As described above, in this embodiment, other than the technical advantages in the embodiments described above, since the rotor magnet 72, made of the aluminum manganese magnet material having high mechanical strength, directly contacts the edge portion 44a of the second flange portion 44 and is positioned and held by the holding portion 13f of the third flange portion 75 that is formed in its lower direction, the rotor yoke 31 or 61 can be omitted, and cost can be reduced by reducing number of parts.

Figure 12:
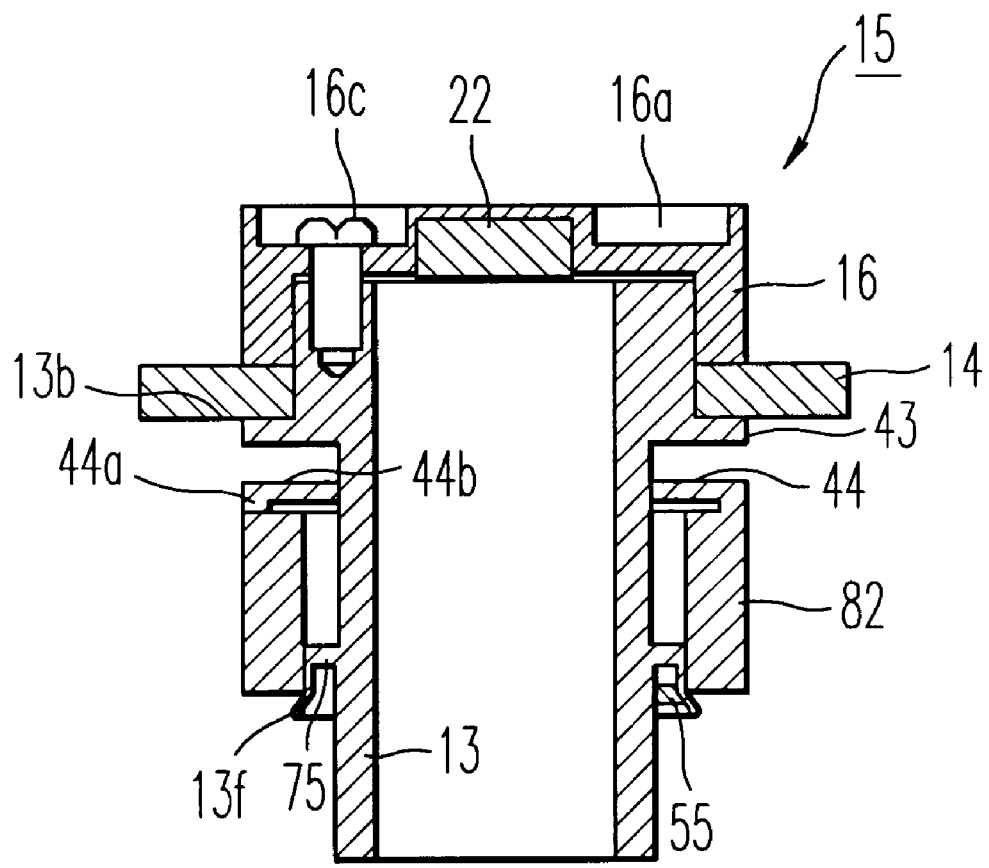
FIG. 12 is a sectional view in a vertical direction showing a whole structure of a sixth embodiment of a self acting air bearing type polygon scanner using a rotor structure according to the present invention.
Figure 13:
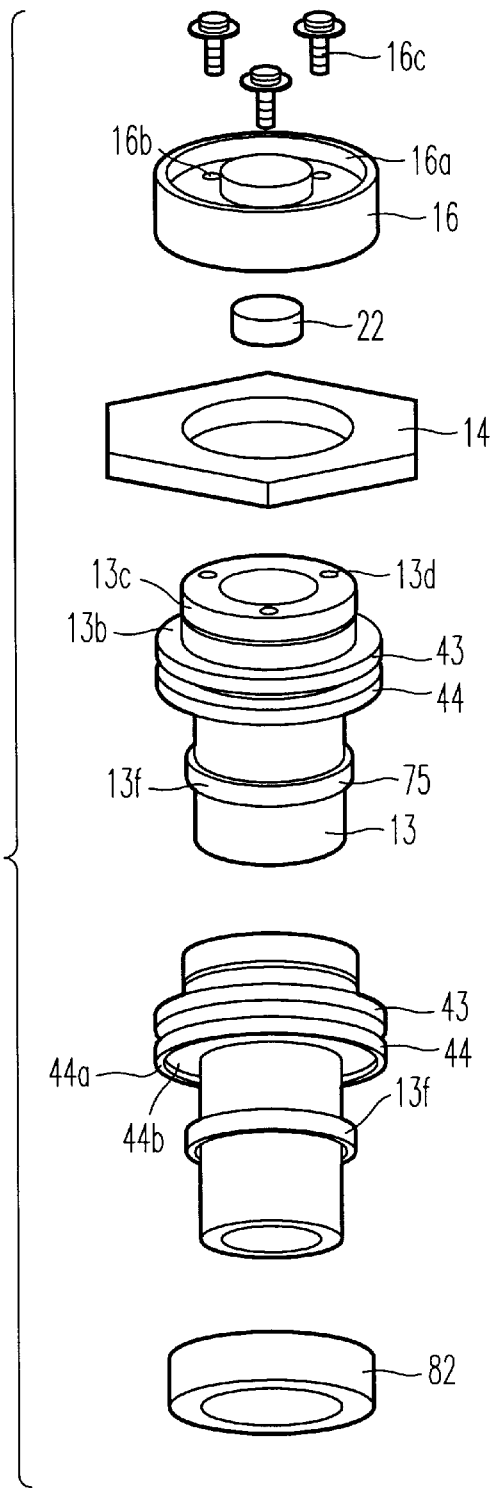
FIG. 13 is an exploded perspective view of the rotor of FIG. 12.

FIGS. 12 and 13 are views showing a sixth embodiment of a self acting air bearing type polygon scanner using a rotor structure according to the present invention. Similar elements are labeled consistent with same components described in reference to the previous embodiments. Accordingly, the present description of the present embodiment will emphasize the different features including how the rotor magnet as the rotor member is held and fixed to the hollow rotating shaft is described.

In both FIGS. 12 and 13, numeral 82 is a rotor magnet made of aluminum manganese magnet material, and the rotor magnet 82 is formed in a ring shape across the peripheral surface of the hollow rotating shaft body 13 and a space is preserved in the outer direction of the outer surface side. Therefore in this embodiment, as similar to the above embodiment, the rotor magnet 82 directly contacts the edge portion 44a of the lower surface 13c of the second flange portion 44 of the hollow rotating shaft 13 and is held by the holding portion 13f of the third flange portion 75 that is formed close to the edge of the rotor magnet 82. The structure forms a direct current brushless motor of a radial gap inner rotor type that includes the driving coil in an outer surface side of the rotor magnet 82.

In this embodiment, in order to correct the balance of the rotor 15, the dead weight 55 is arranged in a space between the holding portion 13f and the peripheral surface of the hollow rotating shaft body 13.

As described above, in this embodiment, the same technical advantages as ones described above can be obtained. Furthermore the rotor magnet 82 of the ring shape, made of aluminum manganese magnet material having high mechanical strength, is held by the edge portion 44a of the second flange portion 44, is directly positioned by the holding portion 13f of the third flange portion 75. Advantageously, the number of parts can be reduced and the direct current brushless motor of the radial gap inner rotor type is formed.

Figure 14:
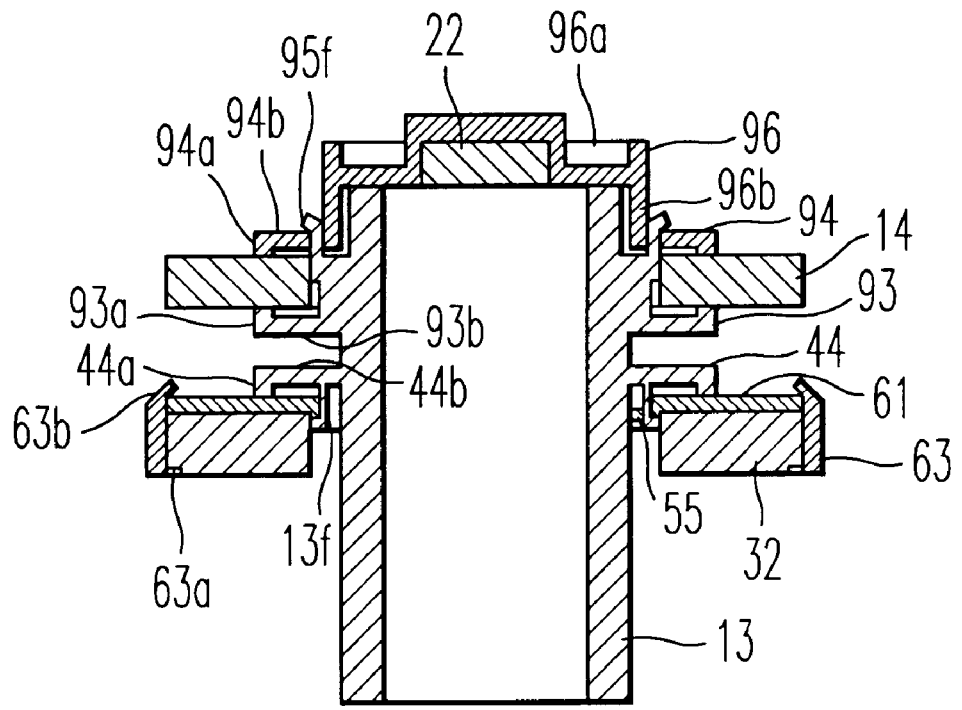
FIG. 14 is a sectional view in a vertical direction showing a whole structure of a seventh embodiment of a self acting air bearing type polygon scanner using a rotor structure according to the present invention.
Figure 15:
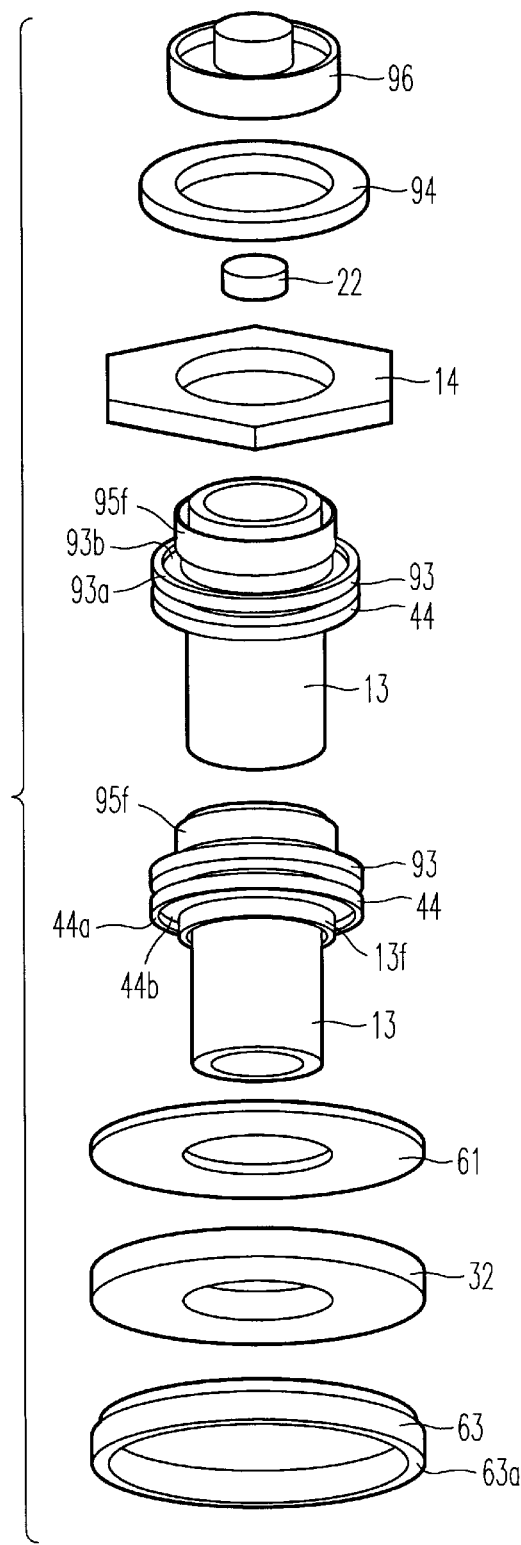
FIG. 15 is an exploded perspective view of the rotor of FIG. 14.

FIGS. 14 and 15 are views showing a seventh embodiment of a self acting air bearing type polygon scanner using a rotor structure according to the present invention. Similar elements are labeled consistent with same components described in reference to the previous embodiments. Accordingly, the present description of the present embodiment will emphasize the different features including how the rotor yoke and the polygon mirror as the rotor member is held and fixed to the hollow rotating shaft.

In both FIGS. 14 and 15, numeral 93 is a fourth flange portion, and an edge portion 93a and an inner periphery portion 93b are formed in the first flange portion 43 in the forth embodiment described above, and the polygon mirror is mounted on the forth flange portion 93. The edge portion 93a of the forth flange portion 93 is formed so as to be extended to the polygon mirror side, and its inner periphery portion 93b is formed so as to be thin and elastic in the rotating shaft direction, in a side adjacent to the peripheral surface of the hollow rotating shaft body 13e. In this embodiment, the polygon mirror 14 is positioned and held by being pressed by the mirror keeper 94 that is formed as a ring. In the embodiment described above, this mirror keeper 16 is formed as a cap and is also used for the magnet holder that holds the permanent magnet 22. However, in the present embodiment, the mirror keeper 94 is formed so as to be separate from the magnet holder 96 formed in the cap shape and the two are positioned and held to the hollow rotating shaft 13 respectively and separately.

In the mirror keeper 94, so as to face to the forth flange 93 in almost a same form, an edge portion 94a that is formed so as to be extended in the direction of the polygon mirror 14, and an inner peripheral portion 94b that is formed so as to be thin and elastic in the direction of the rotating shaft, in the side adjacent to the peripheral surface of the hollow rotating shaft body 13, are formed. The mirror keeper 94 is held to the hollow rotating shaft 13 similar to the rotor yoke 61, and is positioned and held by the holding portion 95f of the ring form whose outer peripheral surface that is extended from the peripheral surface of the hollow rotating shaft body 13 is engaged with the inner surface of the polygon mirror 14.

This holding portion 95f is formed by leaving a step whose outer surface is an extended surface of the periphery surface of the hollow rotating shaft body 13 and by forming a groove in a portion adjacent to the peripheral surface at the same time as when, for instance, the flange portions 44 and 93 etc. are formed by cutting processing. A mirror keeper 94 is engaged with its outer surface and the edge portion 94a is contacted with the polygon mirror 14. Subsequently, the caulking tool is inserted into the groove that is formed in the hollow rotating shaft body 13 so as to caulk and deform and widen plural portions or the whole periphery portion of the tip side and thereby the mirror keeper 94 is positioned and held by being pressed to the upper surface of the polygon mirror 14. At this time, the polygon mirror 14 is contacted by the tip portion 93a of the forth flange portion 93 and the tip portion of the mirror keeper 94a and is applied by stress when the holding portion is caulked and deformed. However, each inner periphery portions 93b and 94b are bent and the surplus stress is absorbed, and thereby the stress does not influence the hollow rotating shaft body 13, and simultaneously the polygon mirror is positioned and held by the elastic force. Namely the forth flange portion 93 forms the large diameter portion, and the edge portion 93a forms a contacting portion, and the inner periphery portion 93b forms an elastic deforming portion. The mirror keeper 94 is formed preferably by material having an elastic modulus smaller or equal to that of the polygon mirror 14 so that the surface accuracy of the polygon mirror 14 is not influenced by the deformation of the above described stress.

Further the magnet holder 96 is held and engaged with a groove that is thinly formed in the inner portion side of the holding portion 95f of the hollow rotating shaft body 13, and at this time, the outer surface of the magnet holder 96 is positioned and held by being engaged with the inner surface of the holding portion 95f. Therefore, in this embodiment, the magnet holder 96 need not be fixed by the screw and the through hole 16b or the screw 16c as in the above embodiments and is omitted. The screw hole 13b in the shaft upper portion 13c of the hollow rotating shaft 13 is also omitted.

In this embodiment, in order to correct the balance of the rotor 15, the dead weight 55 is arranged in a space between the holding portion 13f and the peripheral surface of the hollow rotating shaft body 13.

As described above, other than the technical advantages of the above embodiments, the polygon mirror 14 is held by being contacted by the edge portions 93a and 94a of the forth flange portion 93 and the mirror keeper 94, and therefore, even if the stress that is generated by temperature change or the force of assembling the mirror keeper 94 is applied thereto, the inner peripheral portions 93b and 94b are elastic and bend in the direction of the rotating shaft so the stress is absorbed, and simultaneously the polygon mirror 14 can be positioned and held. Therefore the rotating accuracy of the rotor 15 can be maintained and the rotating member such as the polygon mirror 14 can be assembled to the hollow rotating shaft 13 easily and accurately during assembly.

Moreover, the magnet holder 96 is held by being engaged with the holding portion 95f that holds the mirror keeper 94, and therefore, the processing or the cleaning of the screw hole can be omitted and the number of the part and the process can be reduced and the cost can be reduced.

Figure 16:
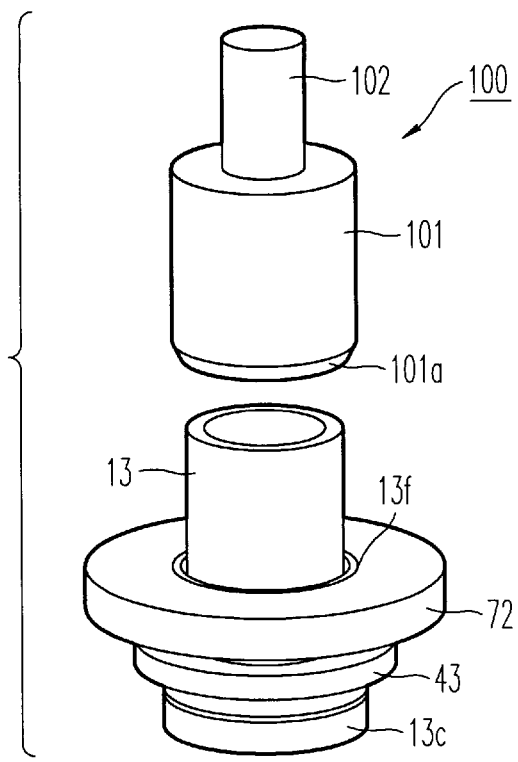
FIG. 16 is a perspective view showing a holding portion caulked by one example of a caulking tool.
Figure 17:
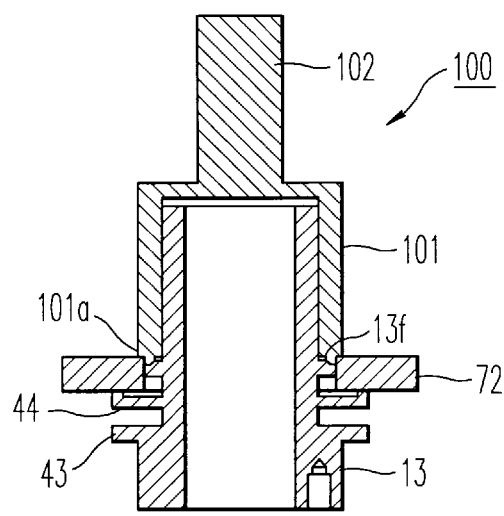
FIG. 17 is a sectional view in a vertical direction of the caulking tool.

One example of the use of the caulking tool will be described briefly. When caulking, the holding portions 13f and 95f are deformed and widened by inserting the caulking tool into each position of its inner surface side one by one. However, a caulking tool 100 shown in FIGS. 16 and 17 is preferably used so that the rotating member such as the inclination of the rotor yoke or polygon mirror etc. is not generated by applying a load uniformly in the peripheral direction.

Figure 18:
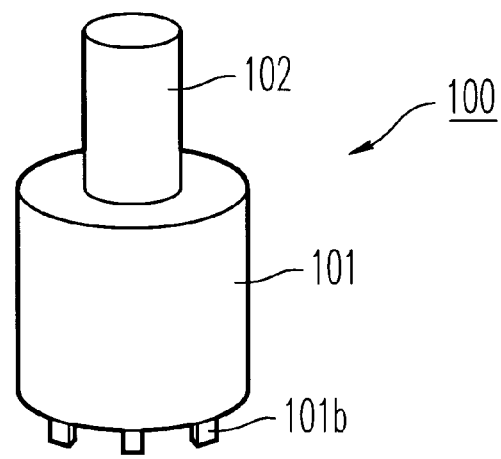
FIG. 18 is a perspective view showing another example of the caulking tool.
Figure 19:
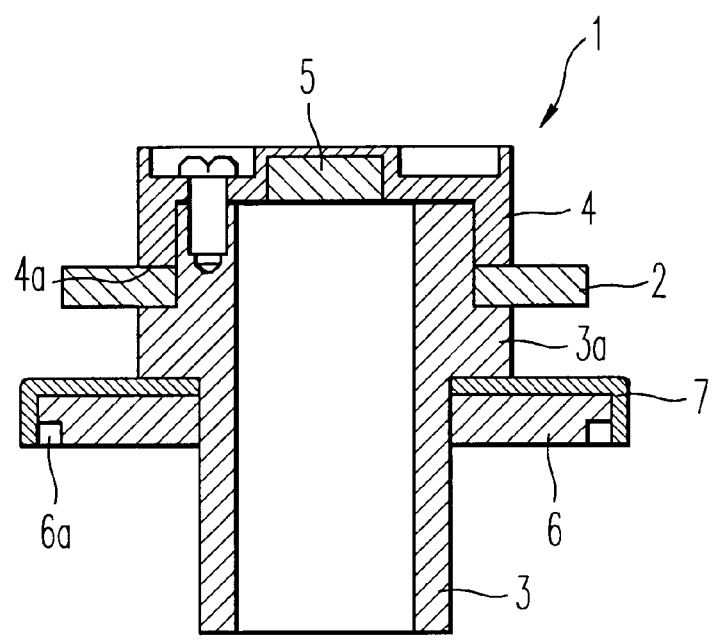
FIG. 19 is sectional view in a vertical direction showing a prior art used in a self acting air bearing type polygon scanner.
Figure 20:
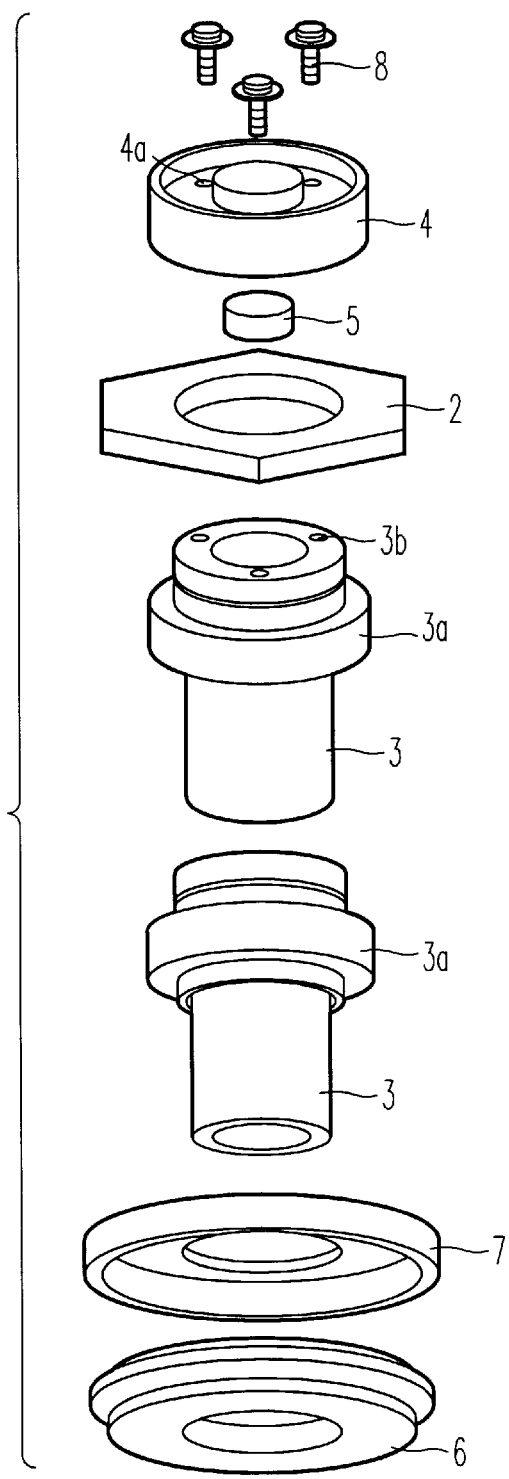
FIG. 20 is a perspective view of the rotor.

This caulking tool 100 has a cylindrical portion 101 that surrounds the hollow rotating shaft body 13 and a holding portion 102 that is held by an operators hand or an apparatus not shown in Figures. The caulking tool 100 has a caulking portion 101a that is tapered in an edge portion of the cylindrical portion 101. When the holding portion 13f in the fifth embodiment, for instance, is caulked, the hollow rotating shaft 13 is positioned in the reverse direction and the rotor magnet 72 is contacted with the edge portion 44a of the second portion 44, and after that, the hollow rotating shaft body 13 is surrounded by the cylindrical portion 101 of the caulking tool 100. The caulking portion 101a is then inserted into a space between the holding portion 13f and the peripheral surface of the hollow rotating shaft body 13 and is pressed, caulked, and deformed so that the whole peripheral of the tip of the holding portion 13f is widened at the same time. In this caulking tool 100, the caulking portion 101a may not be formed along the whole peripheral edge portion of the cylindrical portion 101. However, as shown in FIG. 18, a caulking portion 101b is formed having an edge portion that is divided into plural portions in the peripheral direction and tapered. Plural portions of the holding portions 13f or 95f may be caulked and deformed at the same time.

Finally, technical advantages of the present invention will be described.

According to the present invention, the rotating member is positioned in the direction perpendicular to the rotating shaft by engaging its inner surface with the engaging portion that is formed in the hollow rotating shaft, and is contacted in the rotating shaft direction by the contacting portion, and is positioned and held by pressing the opposite side by the holding portion that is deformed. Therefore, glue or fixing by screws is avoid for fixing the rotating member. Imbalance of the rotor can be prevented by the reduction of the glue, which is subject to temperature induced changes and avoid the occurrence of the rotating member falling down. Further, the processing or the cleaning of the screw hole can be reduced. Therefore, the rotating accuracy of the rotor is maintained and the reliability can be improved, and the numbers of the part and the process is reduced and the cost can be reduced.

According to the present invention, the rotating member is positioned in the rotating shaft direction by contacting the contacting portion that is provided in the elastic deformable large diameter portion from the rotating shaft direction, and therefore the stress when the holding portion is deformed etc. can be absorbed by the elastic deformation of the large diameter portion (the elastic deforming portion), and the rotating member can be positioned by the stable elastic force, by extending the contacting portion in the rotating member direction and by contacting at the stable position. Therefore, the rotating member can be positioned and held as the stress that is generated by temperature change or assembly is absorbed, and the rotating accuracy of the rotor can be maintained.

According to the present invention, the hollow rotating shaft is formed by the aluminum alloy, and the surface preparation or the fixing of material that gains the abrasion resistibility or the lubricity are done in the inner surface of the hollow rotating shaft. Therefore the self acting air bearing property is assured, and the rotating member can be positioned and held by being deformed easily by caulking the holding portion etc. Therefore the assembling work is made easy and the rotor in that the stress that applies hollow rotating shaft body during deforming is reduced, and the rotating accuracy of the rotor is not reduced.

According to the present invention, the rotor yoke is positioned and held as the rotating member, and the outer peripheral surface of the rotor magnet is covered, and therefore the expansion of the rotor magnet can be prevented. Further the direct current brushless motor of the axial gap type can be formed by making the rotor magnet in the disk form. The direct current brushless motor of the radial gap outer rotor type can be structured by forming the driving coil in the ring form. Especially by covering the outer peripheral surface with the nonmagnetic material, magnetic flux is prevented from turning around to the outer side and the driving force is used effectively. The rotor magnet is made of a small diameter and the weight or the moment of inertia are also made small, and thereby the direct current brushless motor of the axial gap type that is suitable for the high speed rotation can be structured.

According to the present invention, the rotor magnet of the aluminum manganese magnet material of high mechanical strength is directly positioned and held as the rotating member, and therefore the direct current brushless motor of the axial gap type or the radial gap inner rotor type that are cost effective can be made by omitting the rotor yoke.

According to the present invention, the holding portion is formed in a ring shape parallel to the peripheral surface of the hollow rotating shaft and is deformed. Consequently, the rotating member is positioned and held, and therefore, the rotor can be formed as the influence of the stress that applies to the hollow rotating shaft during the deforming operation is reduced, and the rotating accuracy of the rotor is not reduced. Further the dead weight for correcting balance is arranged between the holding portion and the peripheral surface of the hollow rotating shaft, and thereby the groove for correcting the balance can be omitted. Further, when the polygon mirror as the rotating member is positioned and held, the member for closing one edge of the hollow rotating shaft is held by engaging one portion of the member between the holding portion and an peripheral surface of the hollow rotting shaft. Therefore, the rotating accuracy of the rotor is maintained and the reliability is improved, and the part count and process steps are reduced for lower manufacturing cost.

According to the present invention, the rotor that holds the polygon mirror of the self acting air hearing type polygon scanner is formed by the various rotor forms of the present invention described above. Therefore the technical advantages in accordance with the rotor structures of the present invention described above can be obtained, and the self acting air bearing type polygon scanner of high reliability and low cost can be provided.

Obviously, numerous modifications and variations of the present invention are possible in light of the above teachings. It is therefore to be understood that within the scope of the appended claims, the invention may be practiced otherwise than as specifically described herein.

The present application contains subject matter disclosed in Japanese patent application 09-013033, to which the present document claims priority, the contents of which is incorporated herein by reference.

What is claimed as new and is desired to be secured by Letters Patent of the United States is:

1. A rotor comprising:
   a hollow rotatable shaft configured to rotate in a rotating shaft direction and being supported by, but not contacting, a radial self-acting air bearing;
   a contact portion configured to maintain a position of a rotating member in a rotating shaft direction by contacting the rotating member along the rotating shaft direction; and
   an engage portion that engages an inner surface of the rotating member and is configured to maintain a position of the rotating member in a direction perpendicular to the rotating shaft direction, said engage portion having
      a holding portion with an extension that extends in a peripheral direction, said extension including at least one of
         plural extension members, and
         a single integral extension portion, wherein
   a portion of said extension being disposed against the inner surface of the rotating member, and
   said extension being deformed in a radial direction so as to press, position and hold the rotating member from a side opposite to the contact portion.

2. The rotor of claim 1, wherein:
   the contact portion includes,
      an elastically deformable portion having a large diameter and configured to elastically deform in the rotating shaft direction when a peripheral surface of the hollow rotatable shaft is extended in diameter.

3. The rotor of claim 2, further comprising:
   a thin elastic deforming member positioned at a side peripheral surface of the hollow rotatable shaft, wherein
      the contact portion being extended in the rotating shaft direction with respect to the thin elastic deforming member.

4. The rotor of claim 1, wherein:
   the hollow rotatable shaft comprises an aluminum alloy as a base material,
   an inner surface of the hollow rotatable shaft being prepared to have at least one characteristic of low abrasion and lubricity so as to serve as a bearing surface of the self acting air bearing.

5. The rotor of claim 1, wherein the rotating member comprises:
   a concave shaped rotor yoke held to the hollow rotatable shaft; and
   a rotor magnet mounted on an inner side of the concave shaped rotor yoke so as to cover an outer peripheral surface of the rotor magnet.

6. The rotor of claim 1, further comprising:

the rotating member wherein the rotating member includes,
  a disk shaped rotor yoke held to the hollow rotatable shaft, and
  a rotor magnet mounted in one side of the rotor yoke and having an outer peripheral surface covered with a cylindrical member made of nonmagnetic material.

7. The rotor of claim 1, further comprising:

the rotating member wherein the rotating member includes a rotor magnet made of aluminum manganese magnet material, the rotor magnet being directly held to the hollow rotatable shaft.

8. The rotor of claim 1, wherein:

the holding portion is formed in a ring form oriented parallel to a peripheral surface of the hollow rotatable shaft; and a dead weight is positioned between the holding portion and the peripheral surface of the hollow rotatable shaft so as to correct for an imbalance of the hollow rotatable shaft.

9. The rotor of claim 1, wherein:

the holding portion is formed in a ring form oriented parallel to a peripheral surface of the hollow rotatable shaft and is configured to hold a polygon mirror thereon; and a capping member is positioned over one edge of the hollow rotatable shaft so as to cap the hollow rotatable shaft at one end thereof, said capping member being held by engaging one portion of the capping member between another holding portion and a peripheral surface of the hollow rotatable shaft.

10. A rotor comprising:

means for rotating a polygon mirror on a shaft including means for supporting the shaft without contacting the shaft;

means for maintaining a position of the shaft in a rotating shaft direction including means for contacting the shaft along the rotating shaft direction; and means for engaging an inner surface of the shaft so as to maintain a position of the shaft in a direction perpendicular to the rotating shaft direction, said means for engaging including,
  holding means for pressing, positioning and holding the shaft from a position opposite to where said means for contacting the shaft actually contacts the shaft.

11. A self acting air bearing polygon scanner, comprising:

a polygon mirror;

a radial self-acting air bearing;

an axial bearing;

a rotor having a hollow rotatable shaft that is supported by said axial bearing and said radial self-acting air bearing without contacting the radial self-acting air bearing, said polygon mirror being held to the hollow rotatable shaft; and a motor that drives the rotor in a rotary direction, wherein
  a contact portion of the rotor is configured to maintain a position of a rotating member in a rotating shaft direction by contacting the rotating member along the rotating shaft direction, and
  an engage portion of said rotor engages an inner surface of the rotating member and is configured to maintain a position of the rotating member in a direction perpendicular to the rotating shaft direction, said engage portion having
    a holding portion with an extension that extends in a peripheral direction, said extension including at least one of
      plural extension members, and
      a single integral extension portion, wherein
    a portion of said extension being disposed against the inner surface of the rotating member, and
    said extension being deformed in a radial direction so as to press, position and hold the rotating member from a side opposite to the contact portion.

12. The self acting air bearing polygon scanner of claim 11, wherein:

the contact portion of the rotor includes,
  an elastically deformable portion having a large diameter is configured to elastically deform in the rotating shaft direction when a peripheral surface of the hollow rotatable shaft is extended in diameter.

13. The self acting air bearing polygon scanner of claim 12, wherein said rotor further comprises:

a thin elastic deforming member positioned at a side peripheral surface of the hollow rotatable shaft, wherein
  the contact portion is formed as being extended in the rotating shaft direction with respect to the thin elastic deforming member.

14. The self acting air bearing polygon scanner of claim 11, wherein:

the hollow rotatable shaft comprises an aluminum alloy as a base material;

an inner surface of the hollow rotatable shaft being prepared to have at least one characteristic of low abrasion and lubricity so as to serve as a bearing surface.

15. The self acting air bearing polygon scanner of claim 11, wherein the rotating member comprises:

a concave shaped rotor yoke held to the hollow rotatable shaft; and a rotor magnet mounted on an inner side of the concave shaped rotor yoke so as to cover an outer peripheral surface of the rotor magnet.

16. The self acting air bearing polygon scanner of claim 11, further comprising:

the rotating member wherein the rotating member includes,
  a disk shaped rotor yoke held to the hollow rotatable shaft, and
  a rotor magnet mounted in one side of the rotor yoke and having an outer peripheral surface covered with a cylindrical member made of nonmagnetic material.

17. The self acting air bearing polygon scanner of claim 11, further comprising:

the rotating member wherein the rotating member includes a rotor magnet made of aluminum manganese magnetic material, the rotor magnet being directly held to the hollow rotatable shaft.

18. The self acting air bearing polygon scanner of claim 11, wherein:

the holding portion is formed in a ring form oriented parallel to a peripheral surface of the hollow rotatable shaft; and a dead weight is arranged between the holding portion and the peripheral surface of the hollow rotatable shaft so as to correct a balance of the rotatable shaft.

19. The self acting air bearing polygon scanner of claim 11, wherein:

the holding portion is formed in a ring form oriented parallel to a peripheral surface of the hollow rotatable shaft and is configured to hold a polygon mirror thereon; and a capping member is positioned over one edge of the hollow rotatable shaft so as to cap the hollow rotatable shaft at one end thereof, said capping member being held by engaging one portion of the capping member between another holding portion and a peripheral surface of the hollow rotatable shaft.

* * * * *